United States Patent [19]

Babb, Jr.

[11] 3,920,270

[45] Nov. 18, 1975

[54] PIPE COUPLING

[76] Inventor: Howard R. Babb, Jr., 36 Darbyshire Drive, Columbus, Ohio 43220

[22] Filed: Oct. 3, 1973

[21] Appl. No.: 403,271

[52] U.S. Cl. ............... 285/104; 285/177; 285/179; 285/321; 285/339; 285/368; 285/369; 285/DIG. 2
[51] Int. Cl.² ......................................... F16L 17/02
[58] Field of Search ........... 285/104, 105, 321, 339, 285/421, 369, 113, 323, 177, 179, 368, DIG. 2; 403/371, 369

[56] References Cited
UNITED STATES PATENTS

| | | | |
|---|---|---|---|
| 1,898,623 | 2/1933 | Gammeter | 285/104 X |
| 2,020,554 | 11/1935 | Johnson | 285/104 X |
| 2,346,051 | 4/1944 | Seamark | 285/104 X |
| 2,508,914 | 5/1950 | Graham | 285/105 |
| 3,326,791 | 6/1967 | Heuze | 403/369 X |
| 3,743,326 | 7/1973 | Courtof et al. | 285/323 X |

FOREIGN PATENTS OR APPLICATIONS

| | | | |
|---|---|---|---|
| 694,020 | 9/1965 | Italy | 285/339 |
| 970,887 | 9/1964 | United Kingdom | 285/104 |

Primary Examiner—Thomas F. Callaghan

[57] ABSTRACT

A coupling or joint for use in connecting pipe sections, pipe fittings, and other similar hardware associated with pipe systems, comprising a sleeve member of polyvinyl chloride or similar plastic material, sealing means, and means for retaining a pipe end in said sleeve member, said retaining means comprising a metallic angularly transverse split ring. The split ring is positioned in a groove in the sleeve and by virtue of its sloping outer surface, toothed inner surface, flange, and its relationship with the groove, provides a controlled gripping action upon the pipe end being retained. Means are thus also provided for limiting movement of the retaining means relative to the sleeve, the groove and inserted pipe end. This means is provided so that the amount by which the teeth of the toothed inner surface of the split ring become embedded in the pipe end may be limited.

The invention may be used in several different forms or embodiments. In particular, the grooves may be formed exteriorly of the sleeve and the retaining means positioned in such grooves may grip the interior of a pipe to be joined to or by the coupling.

2 Claims, 16 Drawing Figures

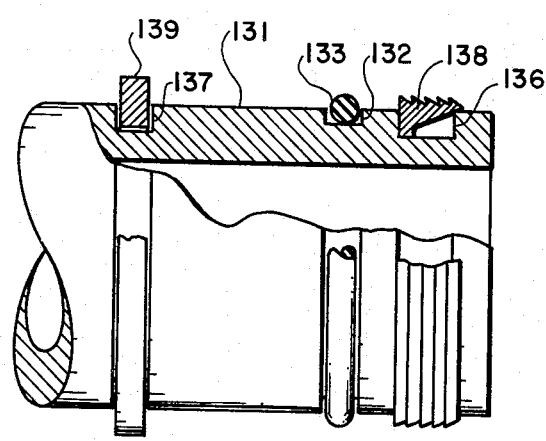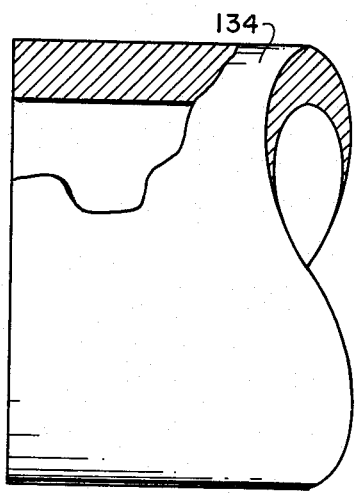
Fig. 13
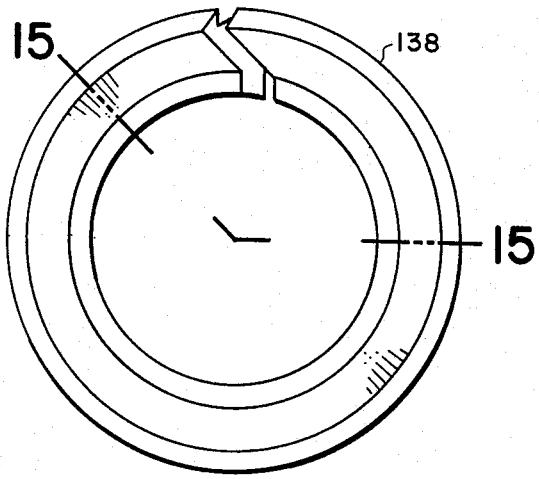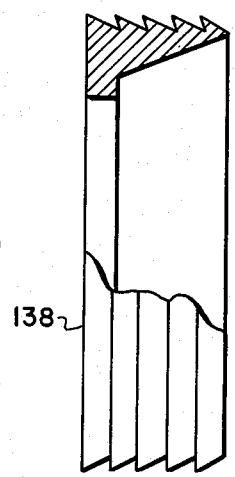
Fig. 14    Fig. 15
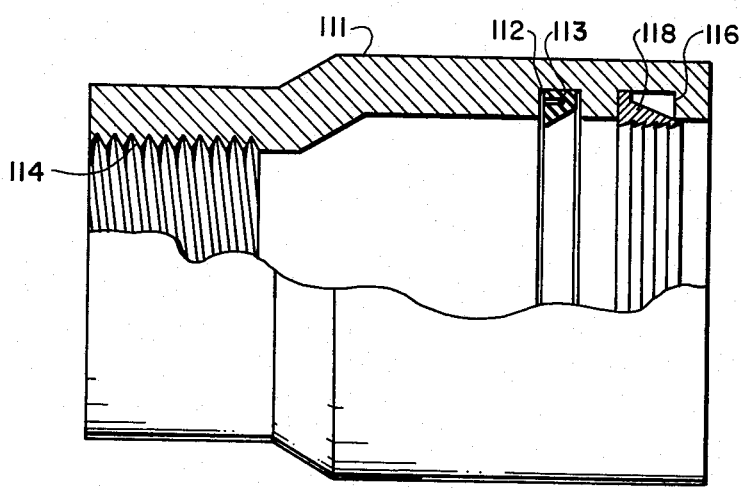
Fig. 16

PIPE COUPLING

BACKGROUND OF THE INVENTION

1. Field of the Invention

This invention is concerned with pipe couplings particularly designed for connecting or joining pipe sections, fittings, and other hardware associated with pipe systems. Specifically, the invention relates particularly to the use of a toothed angularly transverse split ring to provide means for securing pipe joints. More particularly, the invention relates to a collar or radially extending flange on said split ring which, when used in conjunction with a sloping surface on said ring and its receiving groove, provides a means for controlling the manner in which said split ring secures the pipe joint. This control allows the connected pipes to be firmly secured while preventing the joint from blowing out under high pressures due to the split ring becoming embedded excessively in the plastic pipe and also minimizing damage to the pipe as a result of being so secured by limiting the extent to which the teeth of said ring may become embedded in the thermoplastic material of the pipe being joined.

2. Prior Art

Pipe couplings or joints have been the subject of many patents, including U.S. patents to Gammeter 1,898,623, Spang 2,017,994, Seamark 2,346,051, Payne 2,535,694, Altemus et al. 2,871,031, Ouderkirk et al. 3,204,998, Jackson et al. 3,563,574, Alpine 3,575,430 and Alpine 3,638,972. Examples of foreign patents issued in this area are Seamark 694,020 Italy, Hawle 237,391 Austria, and Bennett 1,300,078 France.

In addition to the couplings or joints which have been patented, others have been designed and manufactured such as the metallic coupling designed by the Mueller Company, Decatur, Illinois which is called "The Mueller Insta-tite Connection," and which is formed of brass with an irregular inner and outer conformation and which utilizes a resilient O-ring and a plastic one-way grip ring. This coupling is shown in a circular printed by the Mueller Company and designated as their "Form 10110." A plastic coupling employing sealing gaskets has been designed by the Certain-Teed Products Corporation, Valley Forge, Pennsylvania and is shown in a circular printed and distributed by that company and designated "Form FTV-1".

The Mueller construction utilizes only one sloping groove and positions both an O-ring and a grip ring within that one groove. The Mueller coupling is formed of metal, specifically brass, and is expensive to manufacture and not entirely satisfactory in operation. The Certain-Teed construction does not have within the coupling any means for gripping the pipe nor for preventing the pipe from blowing out of the coupling. Heretofore I have designed a coupling consisting of a plastic sleeve having four annular grooves in the interior surface thereof. Two of these grooves were rectangular and housed sealing rings similar to the sealing rings disclosed herein. The other two grooves were triangular in cross section and housed a split ring somewhat similar to the split rings disclosed herein but there are essential differences. Most importantly, the prior split rings did not have a radial flange or any other means for limiting the longitudinal movement of the split ring, thus limiting the depth to which the ring became embedded in the pipe end. The result was that at pressures up to about 380 psi the coupling worked perfectly. However, at pressures of the fluid in the pipes and coupling of 380 psi, or over, the rings became totally embedded in the pipes by cold flow of the plastic thereof and the pipes blew out of the coupling. Therefore, it is ncessary to provide some external means for holding the pipe against blowing out. Normally, in practice, it has been found desirable to encase the coupling joint in concrete to prevent such disengagement of the pipe from the coupling and consequent loss of fluid being transported through the pipe.

Various other methods have also been used to secure pipe joints. In the case of plastic pipe, a joint for such pipe is sometimes made in accordance with a system for coupling known as the solvent weld method. This method involves applying a solvent to either or both ends of the pipes being connected, for instance to a spigot end received in a socket. The solvent then welds the pipes together. In the case of metallic pipe, a joint for such pipe is often held by clamps and rodding; as, for example, as is shown in the U.S. patents to Stephens 3,144,261 and Metcalfe 3,374,012.

In the devices previously used and disclosed in the references referrred to above, either the couplings are extremely expensive, or they do not have a smooth outer surface, or they are so designed that they tend to crush or deform the pipes which they are designed to connect, or they do not efficiently overcome the problems encountered as a result of thermal expansion and contraction. There is, therefore, a need for pipe couplings which are economical, convenient to use, and are capable of not only sealing adjoining pipes and compensating for thermal expansion, but also of keeping the joints from blowing apart.

It is desirable and necessary that a coupling be provided which will safely, securely, and efficiently connect plastic pipes without the danger of the pipes blowing out of the coupling.

It is therefore an object of this invention to provide improved couplings, fittings, and other hardware for pipe and especially for synthetic plastic pipe.

Another object of the invention is to provide couplings, fittings and other hardware formed of synthetic plastic.

It is a further object of this invention to prevent blowouts of pipe joined by a plastic material coupling by limiting the extent to which a metallic retaining ring may become embedded in a plastic pipe by reason of "cold flow" of the plastic.

A further object of the invention is the improvement of the shaping or rake of the teeth of a retaining ring of a pipe coupling for plastic pipe.

It is a further object of this invention to provide a new and improved transition gland to be secured between a standard mechanical fitting and the end of a pipe formed of plastic material.

Further objects and features of the invention will be apparent from the following specification when considered in connection with claims and drawings.

SUMMARY OF THE INVENTION

This invention rleates to pipe couplings or joints and may take one of several forms. For example, there are specifically shown pipe couplings designed for joining pipe sections. These couplings consist of a combination of a suitable synthetic plastic tube or sleeve (as for example, of polyvinyl chloride), rubber gaskets for sealing, and metallic split rings for gripping the pipe sections being connected. Said rings are formed with sloping outer or inner surface.

In one embodiment of the plastic tube has a substantially uniform cylindrical outer surface and s substantially uniform cylindrical inner surface excep for (1) a pair of projecting sloping surfaces serving as stops and (2) four or more rectangularly shaped annular grooves formed in said inner surface. Into one groove at each end of the coupling there is inserted a split ring having teeth on its inner surface arrangd to grip the end of a pipe inserted into said coupling past said split ring. The rake of the teeth on the inner surface of the split ring is such as to oppose any outward movement of the inserted pipe. One edge of the grooves into which the split rings are inserted combines with the sloping surface on the outer side of the associated split ring so that when an attempt is made to withdraw the pipe from said coupling, the split ring is caused to slide longitudinally a very short distance in the groove, thereby causing a contraction of the split ring which thus grips the pipe tighter. The amount of gripping action is limited by a flange on the split ring which limits the longitudinal movement of said split ring and therefore also limits the amount of the grip applied to the pipe by the split ring. The longitudinal movement of the split ring within its receiving groove also allows for the expansion and contraction of the coupled pipe while maintaining positive contact between the split ring and the coupled pipe.

In each of the other two grooves, there is inserted a rubber (natural or synthetic) sealing ring which serves as a gasket. The sealing rings are preferably positioned in grooves which are inward of the split rings. Adjacent the middle of the coupling, means are provided for stopping the inward movement of, guiding, and centering the end of any pipe inserted therein. These means may comprise either a short sloping surface formed as a projection on the inside of the cylindrical coupling member, or an abrupt stop also formed as a projection on the inner surface of the coupling member, or may comprise a metallic or rubber insertion in grooves adjacent the center of the coupling member.

Several other embodiments of the invention are also disclosed. They are, generally speaking, also couplings of the same nature utilized in the coupling described above.

The device which is disclosed herein is a relatively low cost unit designed not only to seal adjoining pipes, fittings, and other hardware, but also to compensate for thermal expansion and contraction while preventing the pipes from blowing apart. The result is achieved without the necessity for rodding, clamps, etc., and without the need of embedding the joint in concrete or using the solvent weld method.

BRIEF GENERAL DESCRIPTION OF THE DRAWINGS

FIG. 13 is a view partly in elevation and partly in longitudinal section of a different form of coupling embodying the invention, this view illustrating the end portion of a pipe formed of plastic material, positioned just away from the end of the modified form of the coupling in preparation for insertion thereon.

FIG. 14 is a view in elevation of a metallic split ring which is used in the embodiment of the invention illustrated in FIG. 13.

FIG. 15 is a view partly in elevation and partly in section taken substantially on the line 15—15 of FIG. 14.

FIG. 16 is a view partly in elevation and partly in longitudinal section of a reducer fitting embodying my invention.

DETAILED DESCRIPTION OF PREFERRED EMBODIMENT OF THE INVENTION

Figure 1:
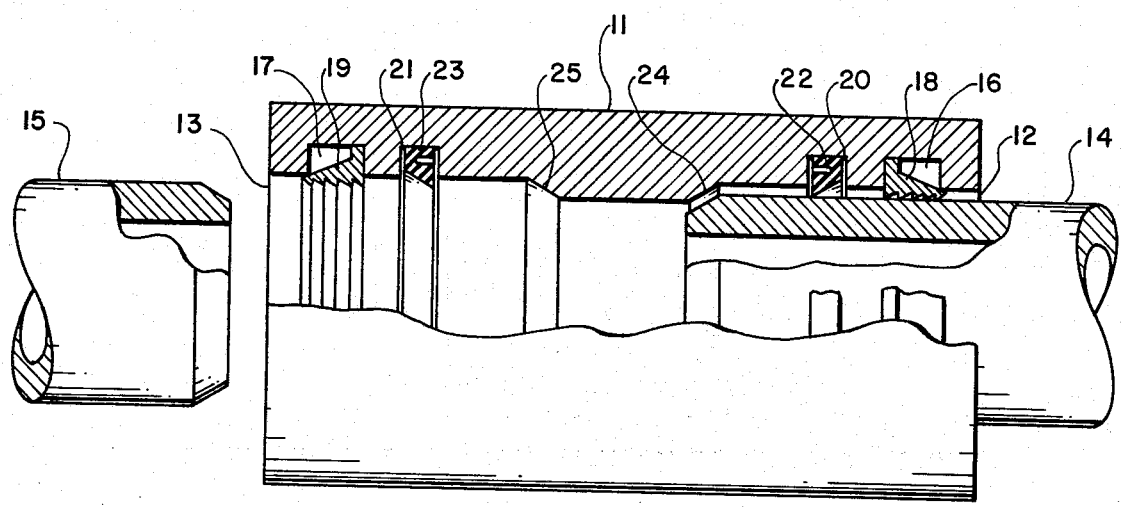
FIG. 1 is a view mainly in elevation but partly in longitudinal section of one embodiment of my invention illustrating the end portion of a pipe section inserted into one end of a sleeve of a coupling and further illustrating the end portion of the other pipe section positioned just outside the opposite end of the coupling sleeve in preparation for insertion into the coupling at that end.

Referring to FIG. 1 of the drawings for a more detailed description of the preferred embodiment illustrated, it may be seen that there is shown a coupling member 11 which is comprised of a sleeve or tube with a socket at each end for reception of ends of pipes to be joined as indicated at 12 and 13. Also shown is a section of pipe 14 having one end inserted in one end of the coupling member 11 with a portion of another pipe 15 ready to insert in the other end of the coupling sleeve.

Near the mouth of both sockets 12 and 13, the coupling member 11 is provided with a pair of rectangularly shaped grooves 16 and 17 respectively for receiving metallic (preferably brass) split rings 18 and 19 respectively. Inward of grooves 16 and 17 are additional rectangularly shaped grooves 20 and 21 provided for receiving synthetic rubber gaskets 22 and 23. A pair of sloping surfaces 24 and 25 are formed on the interior surface of the coupling member 11 to gradually stop and limit inward movement of the ends of the pipes inserted into the coupling member and also to guide and center the inserted pipes within the coupling member.

Split rings 18 and 19 are inserted into grooves 16 and 17. These rings have substantially a right triangle shape in cross section except for a flange 26 extending radially outward from the base of the triangular cross section. The rings are manufactured with internal teeth 27 which have their rakes slanted toward the interior of the coupling member 11 so that when the end of a pipe is inserted into the coupling member, the teeth allow the pipe to move inward easily, but when an attempt is made to move the pipe outward, the rake of the teeth oppose the outward movement. Such outward movement of the pipe also causes the outward movement of the split ring. Thereupon the split ring is contracted by virtue of the contact of the tapered hypotenuse surface 28 of the split ring and the outer edge of the groove 16 in the coupling sleeve. Said contraction of the split ring embeds the teeth into the surface of the pipe 14 and prevents further outward movement of the pipe by increasing the gripping action of the split ring and also serves as a locking means. Eventually the split ring flange 26 limits the movement of the split ring by providing a positive stop when said split ring moves outward to a point where the split ring flange 26 comes into contact with the outer edge of the groove 16. The provision for a positive stopping means of the contraction of the split ring prevents excessive embedding of the split ring into the outer surface of the pipe. The relationship of the split ring with its receiving groove is such as to allow longitudinal movement of the split ring within its receiving groove. Said movement allows for the expansion and contraction of the coupled pipe. The magnitude of said movement is approximately three-eighths of an inch.

While the provision for expansion and/or contraction of the plastic pipe is important, the most important feature of my new and improved gripping ring is the means for preventing excessive longitudinal movement of gripping split ring in order to prevent embedding the ring into the surface of the end of the plastic material pipe. I have found that rings similar to rings 18 and 19 will grip the ends of pipes firmly and will operate efficiently up to pressures of 380 psi, and even beyond, being prevented from being embedded too deeply into the surface of the pipe by the action of the flange 26. The action of the ring 19 in groove 17 on the end of pipe 15 is identical with the action of ring 18 in groove 16 on the end of pipe 14.

Figure 2:
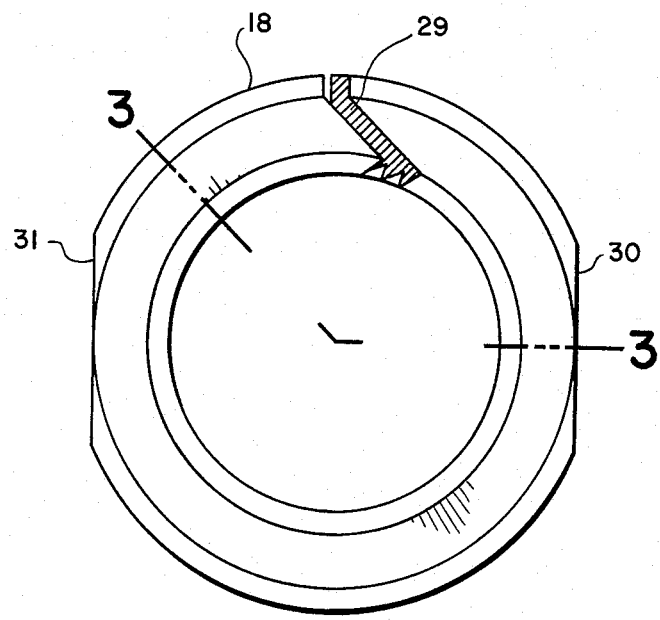
FIG. 2 is a view in elevation of one of the metallic split rings useful in embodiments of my invention.
Figure 3:
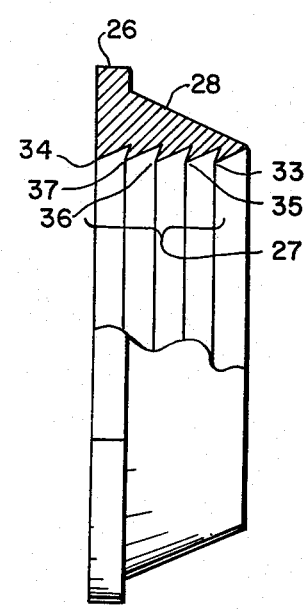
FIG. 3 is a view partly in elevation and partly in section taken substantially on line 3—3 of FIG. 2.

In FIGS. 2 and 3 it can be seen that the split ring 18 is made (as is also split ring 19) with part of the split ring flange 26 ground or flattened off at 30 and 31. There is also a cut 29 made through the split ring at an angle to its axis. These features facilitate the installation of the split ring into its receiving groove.

The teeth of the split ring 27 are made so that the two outer teeth 33 and 34 have an included angle of 68° with a rake of 90° while the three inner teeth 35, 36 and 37 have an included angle of 40° with a rake of 112°. The two outer teeth 33 and 34 are formed with their inner faces normal to the axis of the ring in order to provide the initial grip on the pipe with a minimum amount of pressure being exerted by the split ring such as occurs when the pipe is first inserted into the coupling sleeve member. The inner teeth 35, 36, and 37 are designed to provide maximum gripping action upon the pipe being coupled under normal conditions.

The relationship of the inner diameter of the split ring in its normal unstressed condition to the outer diameter of the pipe it grips is such as to provide a slight interference fit between the two, thus allowing practically unimpeded insertion of pipes 14 and 15 in sleeve 11, but creating a small initial grip on the pipe by virtue of the springing action of the split ring. The relationship of the outer diameter of the split ring flange to the inner diameter of its receiving groove is such as to allow the longitudinal movement of the split ring within the groove while keeping the diameter of said groove to a minimum.

Figure 4:
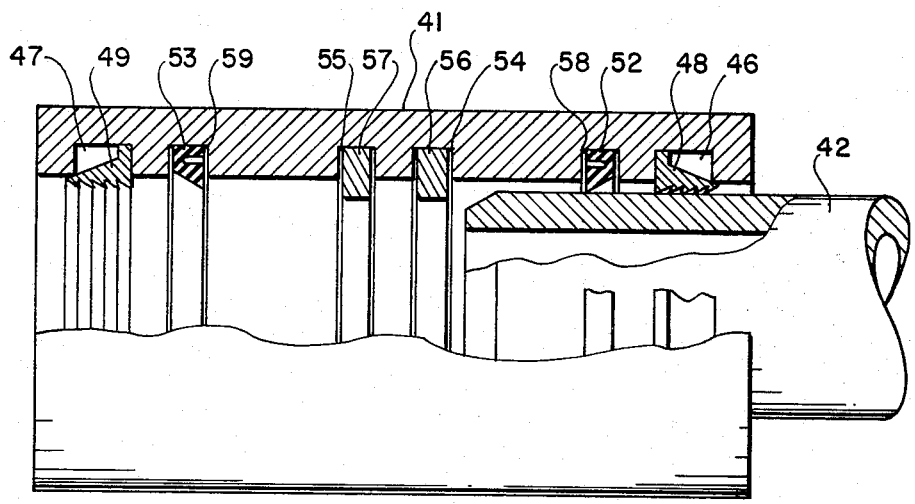
FIG. 4 is a view partly in elevation and partly in longitudinal section of a coupling somewhat similar to the coupling in FIG. 1, but showing a different means for limiting the depth to which the ends of the pipes may be inserted into the coupling.

FIG. 4 discloses a further embodiment of the invention. Therein is shown a coupling sleeve member 41 having the end of pipe 42 inserted therein. In this figure, the rectangularly shaped grooves for receiving the split rings are designated by the numbers 46 and 47 and the split rings are designated by the numbers 48 and 49. The gaskets 52 and 53 are inserted respectively in the rectangularly shaped grooves 58 and 59. In this embodiment of the invention two additional rectangularly shaped grooves 54 and 55 are located inwardly of the coupling sleeve. They receive two rectangular cross sectioned gaskets 56 and 57. The function of the rectangular cross sectioned gaskets 56 and 57 is to limit the inward movement of the end of the pipe inserted into the coupling sleeve member and also to guide and center the inserted pipe within the coupling sleeve member.

Figure 5:
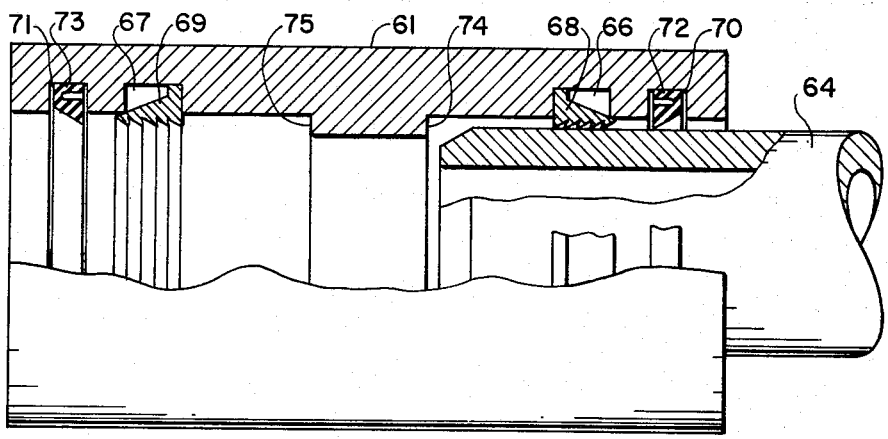
FIG. 5 is a view partly in elevation and partly in longitudinal section similar to FIG. 4, but showing a still different means for controlling depth of pipe insertion and also showing a change in the relative positions of the metallic split ring and the synthetic rubber gasket.

A still further embodiment of the invention is illustrated in FIG. 5. Therein a coupling sleeve member 61 has the end of pipe 64 inserted therein. In this figure, rectangularly shaped grooves 66 and 67 are provided for receiving the split rings 68 and 69. The grooves 66 and 67 are located inward from the rectangularly shaped grooves 70 and 71 for receiving the gaskets 72 and 73. This reverse in the relative positions of the split ring and gasket prevents any possible scoring of the ends of the pipes at any point which would interfere with the sealing by gaskets 72 and 73. The interior of the sleeve member 61 has a pair of perpendicular surfaces 74 and 75 formed to limit the inward movement of the end of the pipe inserted into the coupling and also to guide and center the inserted pipe within the coupling sleeve.

Figure 6:
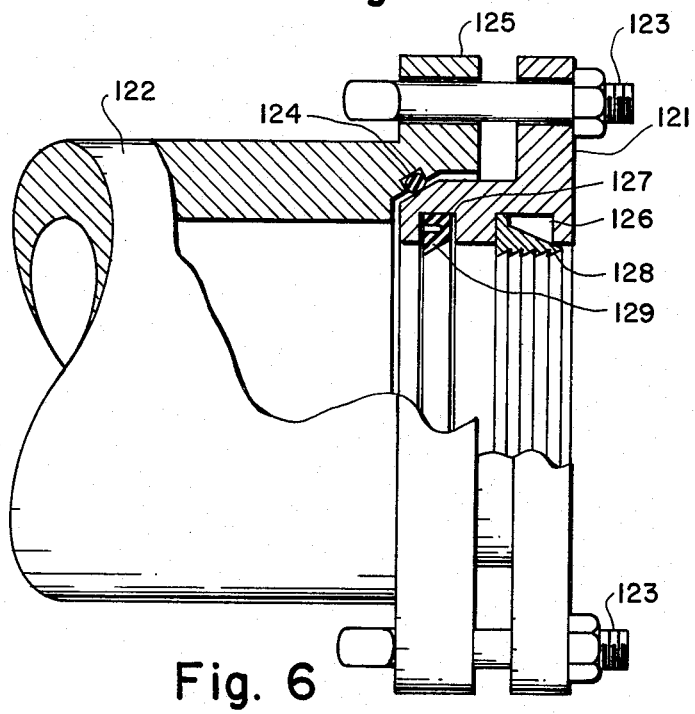
FIG. 6 is a fragmentary view partly in elevation and partly in longitudinal section showing an improved transition gland.

In FIG. 6, there is shown a transition gland 121 secured to a metallic pipe 122 by bolts such as 123. The O-ring 124 seals the connection between the bell 125 of pipe 122 and the transition gland 121. Rectangular grooves 126 and 127 are provided in the gland 121 to receive respectively a split ring 128 (similar to ring 18) and a gasket 129 (similar to gasket 22). The transition gland 121 will receive in sealed relationship a pipe such as the synthetic plastic pipe 14 shown in FIG. 1, provided such synthetic plastic pipe is of appropriate size. The gasket 129 will seal against leakage and the ring 128 will hold the pipe securely within the gland. Thus the metal pipe 122 is connected to the plastic pipe.

Figure 7:
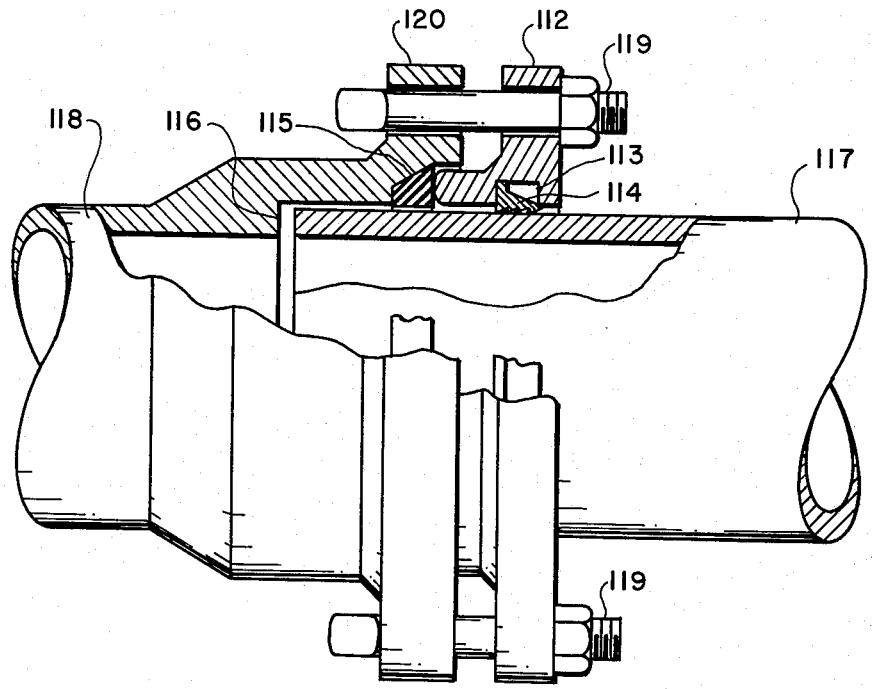
FIG. 7 is a fragmentary view partly in elevation and partly in longitudinal section showing another improved transition gland.
Figure 8:
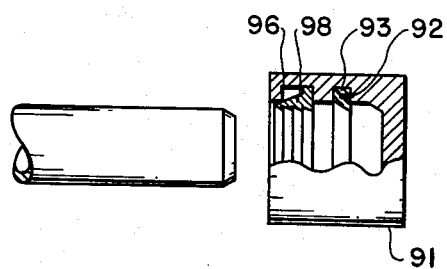
FIG. 8 is a view partly in elevation and partly in longitudinal section of a cap fitting embodying my invention.
Figure 9:
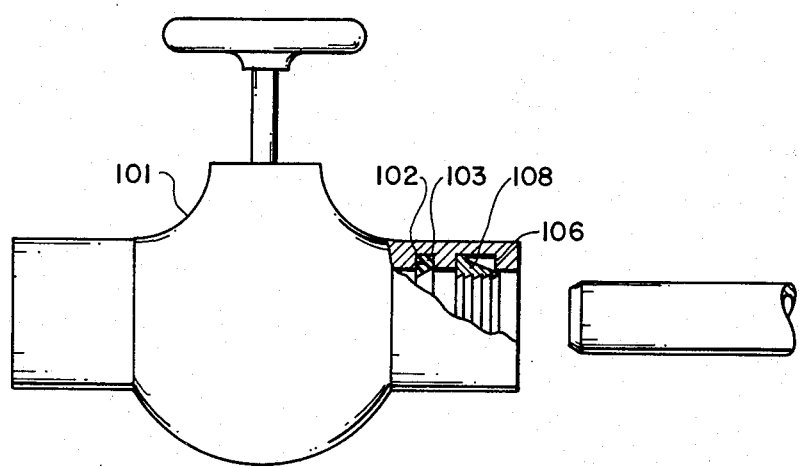
FIG. 9 is a view partly in elevation and partly in longitudinal section of a valve embodying my invention.

FIG. 7 illustrates a transition gland 112 secured to a metallic pipe 118 by bolts such as 119 much in the same manner as in FIG. 6. In this configuration, however, the transition gland 112 contains only one groove 113 which receives a split ring 114. A sealing relationship between the pipe bell 120, the transition gland 112, and the inserted pipe 117 is provided by a gasket 115 of appropriate cross section which is not connected to or contained in the transition gland 112. The inner ridge 116 of the pipe bell limits the inward movement of the end of the inserted pipe 117. Thus the metal pipe 118 is connected to the plastic pipe 117.

In FIGS. 10, 8, 9, and 16 there are shown respectively an elbow fitting 81, a cap fitting 91, a valve 101, and a reducer fitting 111 which are embodiments of my invention.

Figure 10:
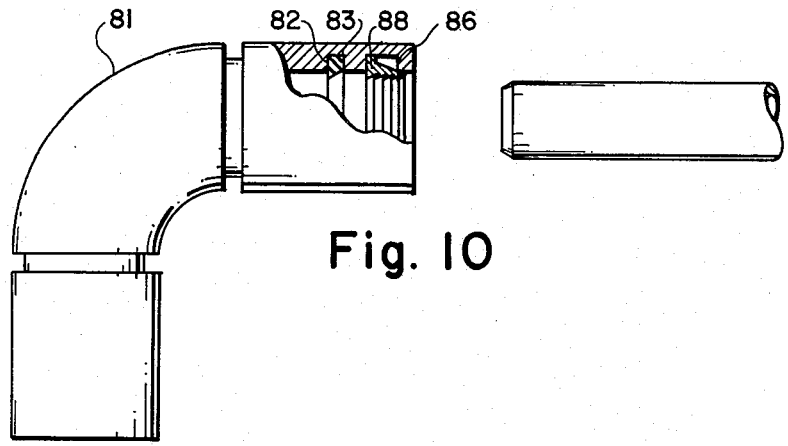
FIG. 10 is a view partly in elevation and partly in longitudinal section of an elbow fitting embodying my invention.

Referring still to FIGS. 10, 8, 9, and 16 for a more detailed description of the embodiments illustrated, it may be seen that in FIG. 10 the elbow fitting 81 has two rectangularly shaped grooves 82 and 86 provided for receiving respectively gasket 83 and split ring 88. Cap fitting 91 has rectangularly shaped grooves 92 and 96 for receiving respectively gasket 93 and split ring 98. Valve 101 has similar grooves 102 and 106 for receiving respectively gasket 103 and split ring 108. Reducer fitting 111 is provided with threads 114 to connect it to threaded pipe and is formed with rectangularly shaped grooves 112 and 116 for receiving respectively gasket 113 and split ring 118. Not shown are similar split rings and gaskets assembled in the opposite ends of elbow fitting 81 and valve 101. Means for limiting inward movement of, guiding, and centering the pipe are also not specifically illustrated in the above embodiments, but may be had by employing any of the aforementioned such means.

Figures 11, 12:
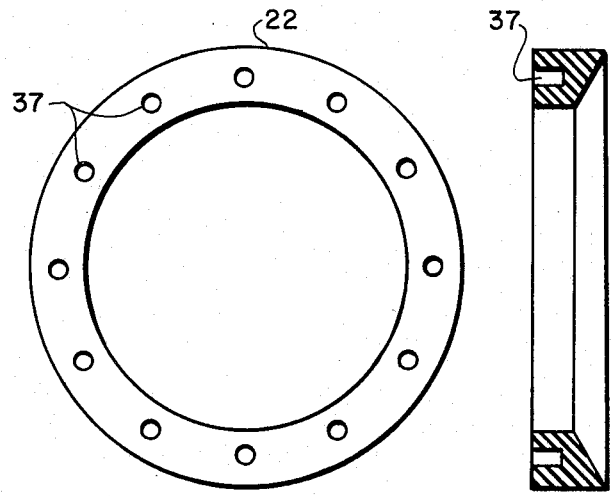
FIG. 11 is a plan view of a gasket useful in the invention.
FIG. 12 is a view in longitudinal section of the gasket of FIG. 11.

FIGS. 11 and 12 illustrate one of a variety of forms of a gasket suitable for this invention. The gasket 22 shown is somewhat similar to the ring disclosed in Altemus et al U.S. Pat. No. 2,871,031 issued Jan. 27, 1959. The gasket 22 in general, comprises an annulus having a somewhat wedge-shaped cross section and is preferably provided with a series of recesses 37 which accumulate flow and allow the fluid to cause distortion of the resilient material of the ring when the pipe is inserted into the ring. This action increases the holding and sealing capacity of the ring by allowing the spreading of the distal ends of the annular ring when fluid under pressure moves into the holes. The ring is desirably formed of an elastomeric material, such as natural or synthetic rubber, as is common for rings of this general type.

Although the preferred embodiment of the invention contemplates a means of securing and sealing pipe couplings and joints utilizing the outer diameter of the pipe, this invention may be used to secure and seal pipe joints and couplings utilizing the inner diameter of the pipe. This arrangement is especially useful in a securing larger diameter pipes. FIG. 13 illustrates a coupling sleeve member 131 ready to insert into a pipe section 134. Into rectangularly shaped grooves 136 and 132 are inserted respectively split ring 138 for securing and O-ring 133 for sealing the joint. Into rectangularly shaped groove 137 is inserted rectangular cross sectioned gasket or washer 139 which is employed to limit the inward movement of the end of the pipe inserted onto the coupling tube and also to guide and center the inserted pipe on the coupling tube.

FIGS. 14 and 15 disclose the construction of the split ring 138. It is substantially the same in concept as that of the split ring 18 illustrated in FIGS. 2 and 3 excepting for having the inner and outer elements reversed in position.

As shown in the illustrations, the inserted pipe may have the ouoter diameter of its ends tapered and the coupling member may have a tapered entrance opening (not specifically illustrated) to facilitate pipe insertion. Although this invention is especially useful for synthetic plastic pipe, its application is not limited to such pipe. This invention may also be useful for other types of pipe including metallic pipe, for example, copper pipe.

It is to be understood that the above described embodiments of my invention are for the purpose of illustration only and various changes may be made therein without departing from the spirit and scope of my invention.

I claim:

1. A pipe coupling comprising:
   a. a sleeve member formed with a plurality of rectangular grooves formed internally of the sleeve member at each end thereof and formed of polyvinyl chloride;
   b. a sealing means positioned within one of the grooves at each end of the sleeve member;
   c. means for retaining ends of cylindrical pipe, positioned within another of the rectangular annular grooves at each end of said sleeve member, which grooves are each located nearer the pipe entrance of the coupling than the grooves which house the sealing means, and the retaining means at each end comprising
   an angularly transverse split ring which is internally toothed and housed so as to be limitedly movable within the associated rectangular annular groove, formed internally in the sleeve member, to embrace the outer diameter of the pipe end;
   the minimum diameter of each of the split rings being less than the outer diameter of the pipe inserted;
   means in each case for coacting with one of the grooves to cause the ring to alter its diameter, which causes the ring to contract when moved in one direction relative to its receiving groove and comprises a sloped exterior surface of the split ring making a line contact with the junction between the outer radial side of the associated rectangular groove with the cylindrical wall of the sleeve member to cause the ring to contract; and a radially extending annular external flange formed on the split ring adjacent to the sloping surface for coacting with said radial outer side of the associated rectangular groove to limit the longitudinal movement of the split ring.

2. The pipe coupling of claim 1,
   wherein the radial cross section of each half of the split ring is an irregular pentagon having its base serrated to form gripping teeth, the other four sides being substantially straight lines, a first side adjoining said base being substantially perpendicular to said base, a second side adjoining said perpendicular first side being substantially parallel to said base, a third side adjoining said second side being substantially parallel to said first side and the fourth side being said sloping side and connecting said third side and said base and said first, second, and third sides forming the outline of the flange which limits the longitudinal movement of said split ring.

* * * * *

UNITED STATES PATENT OFFICE
CERTIFICATE OF CORRECTION

Patent No. 3920270  Dated November 18, 1975

Inventor(s) Howard R. Babb, Jr.

It is certified that error appears in the above-identified patent and that said Letters Patent are hereby corrected as shown below:

On the title page of the patent the inventor's street address should be --- 3627 Darbyshire --- rather than 36 Darbyshire.

In column 1, lines 29 and 30, the Ouderkirk et al reference patent should be --- 3,204,988 --- rather than 3,204,998 as is shown.

In column 3, line 50, it should be stated --- and other hardware --- rather than "and other hardward".

Signed and Sealed this sixth Day of April 1976

[SEAL]

Attest:

RUTH C. MASON
*Attesting Officer*

C. MARSHALL DANN
*Commissioner of Patents and Trademarks*